United States Patent

Itoh et al.

(10) Patent No.: US 7,622,203 B2
(45) Date of Patent: Nov. 24, 2009

(54) ALUMINUM NITRIDE SINTERED COMPACT

(75) Inventors: Yasushi Itoh, Itami (JP); Sadamu Ishidu, Itami (JP); Yasushi Tsuzuki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 826 days.

(21) Appl. No.: 10/524,270

(22) PCT Filed: Jul. 30, 2003

(86) PCT No.: PCT/JP03/09705

§ 371 (c)(1), (2), (4) Date: Feb. 11, 2005

(87) PCT Pub. No.: WO2004/016567

PCT Pub. Date: Feb. 26, 2004

(65) Prior Publication Data

US 2005/0269749 A1 Dec. 8, 2005

(30) Foreign Application Priority Data

Aug. 13, 2002 (JP) ............................. 2002-235571

(51) Int. Cl.
*B32B 9/00* (2006.01)
(52) U.S. Cl. .................................................. 428/698
(58) Field of Classification Search ................ 428/698, 428/701; 399/329; 501/98
See application file for complete search history.

(56) References Cited

U.S. PATENT DOCUMENTS 5,732,318 A * 3/1998 Natsuhara et al. ........... 399/329

FOREIGN PATENT DOCUMENTS

| CN | 1130607 | 9/1996 |
|---|---|---|
| EP | 1 142 849 A1 | 10/2001 |
| JP | 1-282157 | 11/1989 |
| JP | 2-302088 | 12/1990 |
| JP | 11-174875 | 7/1999 |
| JP | 2002-68849 | 3/2002 |

OTHER PUBLICATIONS

European Search Report issued in European Patent Application No. EP 03 78 8020, mailed Oct. 29, 2008.
Office Action, Mar. 17, 2006.

* cited by examiner

*Primary Examiner*—Jennifer McNeil
*Assistant Examiner*—Daniel Miller
(74) *Attorney, Agent, or Firm*—McDermott Will & Emery LLP

(57) ABSTRACT

Provided is an aluminum nitride sintered body having a larger area and a smaller thickness as compared to the conventional art, wherein the aluminum nitride sintered body has flatness with controlled warpage and/or waviness height. Methods of producing such sintered body, and further a metallized substrate and a heater using such sintered body are also provided. An aluminum nitride substrate 1 has a maximum length of 320 mm or more, a thickness of more than 0 mm and 2 mm or less, a warpage of 0 μm/mm or more and less than 2 μm/mm, and a local waviness height of 0 μm or more and 100 μm or less.

7 Claims, 8 Drawing Sheets

ALUMINUM NITRIDE SINTERED COMPACT

TECHNICAL FIELD

The present invention relates to an aluminum nitride sintered body, a metallized substrate, a heater, a jig, and a method of producing the aluminum nitride sintered body, and more particularly, to an aluminum nitride sintered body with a flat and large area and a small thickness, a metallized substrate, a heater, a jig, and a method of producing the aluminum nitride sintered body.

BACKGROUND ART

Aluminum nitride sintered bodies are generally used as a raw material of a substrate for various electronic parts, because they have high thermal conductivity, etc. In this specification, the aluminum nitride sintered body refers to a sintered body comprising aluminum nitride as a major component.

When the aluminum nitride sintered body is used as a substrate of electronic parts, the substrate needs to be prepared into a sheet form having a relatively large area and a small thickness. However, product defects such as deflection of a sintered body substrate have been caused in a typical method for producing an aluminum nitride sintered body. Such deflection causes cracks in the substrate or the like.

Therefore, techniques of preventing the generation of deflection in the substrate have been proposed in the past. For example, in Japanese Patent Application Laid-Open No. 2002-68849, it is stated that an aluminum nitride sintered body having a small thickness and a relatively large area without deflection can be produced by controlling a cooling rate within a predetermined range at sintering. Thus, Patent Application Laid-Open No. 2002-68849 discloses an example of the aluminum nitride sintered body having a thickness of 0.6 mm and maximum dimensions of 100 mm×300 mm.

However, recently there has been a demand for a substrate made of an aluminum nitride sintered body (hereinafter, referred to as an "aluminum nitride substrate"), for example, having a size considerably larger than the above-mentioned dimensions of 100 mm by 300 mm, as a substrate for an electronic part used in a laser printer, copying machine, etc. Furthermore, there is a demand for an aluminum nitride substrate having improved properties in terms of flatness such as controlled warp or waviness in addition to properties such as controlled deflection as mentioned above. With such a conventional method as mentioned above, it has been difficult to produce an aluminum nitride substrate having a large area and a small thickness and yet exhibiting such a controlled warp and waviness, and such substrates have not been available.

DISCLOSURE OF INVENTION

The present invention is intended to solve the problem described above, and it is an object of the present invention to provide an aluminum nitride-sintered body having a large area and a small thickness and also having the property of a controlled warp and waviness and further to provide a metallized substrate and a heater using the aluminum nitride sintered body. Another object of the present invention is to provide methods of producing such an aluminum nitride sintered body.

Further, another object of the present invention is to provide a jig used in the above method of producing the aluminum nitride sintered body.

The aluminum nitride sintered body according to a first aspect of the present invention has a maximum length of 320 mm or more, a thickness of more than 0 mm and 2 mm or less, a warpage of 0 µm/mm or more and less than 1 µm/mm, and a local waviness height of 0 µm or more and 50 µm or less.

In this manner, the aluminum nitride sintered body having a large area and having small warpage and waviness is suitable to be used as the substrate for electronic parts, etc. That is, when the substrate made of the aluminum nitride sintered body with large dimensions is used as a material for constructing electronic parts such as a metallized substrate and a heater, the metallized substrate and the heater having a large area can be realized. Further, when manufacturing the metallized substrate and heater with a small size, a large number of metallized substrates and heaters are obtainable from a single substrate by dividing a substrate made of the aluminum nitride sintered body according to the present invention into parts.

In addition, since the substrate made of the aluminum nitride sintered body according to the present invention has an improved flatness as described above, and if, for example, a metallized layer or a heating element is formed on a surface of the body by using screen printing, the occurrence of defects such as unevenness in the layer thickness and/or shape of the metallized layer or heating element caused by warp of the substrate can be reduced. Accordingly, it is possible to form the metallized layer and the heating element with stable quality. Moreover, because of excellent flatness, when performing screen printing, the generation of damage to the screen caused by cracks or warpage in the substrate can be controlled. Accordingly, the occurrence of product defects and risk of breakdown of the screen printing devices can also be reduced. Therefore, it is possible to reduce the manufacturing cost of the electronic parts such as the metallized substrate and heater.

Further, the aluminum nitride sintered body according to the present invention may be a substrate having a rectangular or circular plane form, but may be a bar-shaped body having a diameter (thickness) of 2 mm or less and/or a polygonal cross-section having a maximum width (thickness) of 2 mm or less. If the aluminum nitride sintered body is formed into a planar object (that is, sheet shape) having a plane form of a rectangular shape, the maximum length thereof can be defined as the longest of the diagonal lines on the rectangular shape. Likewise, in the case of the sheet shape aluminum nitride sintered body having a plane form of a circular shape, the maximum length can be defined as the diameter of the circular shape of the substrate.

Also, if the aluminum nitride sintered body according to the present invention is the bar-shaped body, the maximum length can be defined as the longitudinal length of the body. When the aluminum nitride sintered body is the bar-shaped body, the warpage value can be calculated, for example, as described below. That is, when the bar-shaped body is placed on a flat surface, the largest distance between the flat surface and the bottom side of the bar-shaped body is measured, and the warpage value of the bar-shaped body is obtained by dividing this distance by the length of the body. Further, the waviness height of the bar-shaped body can be defined as the height of the highest surface in the locally meandering parts of the body relative to the surface of the parts outside of the locally meandering parts (that is, linearly extending parts of the body).

Thus, if the maximum length is not less than 320 mm, according to the present invention, the substrate made of the aluminum nitride sintered body (also referred to as the aluminum nitride substrate) used to construct a metallized substrate and a heater greater in size than the conventional one is obtainable. The maximum length is preferably not less than 350 mm, and more preferably, 450 mm or more.

Further, if the thickness of the aluminum nitride sintered body according to the present invention is in the range of 0 mm to 2 mm, it is a sufficient thickness for a substrate to construct a heater or the like. Thus, the aluminum nitride substrate of the present invention is easily applicable to construct the electronic parts such as the heater or the like. The thickness of the aluminum nitride sintered body is preferably 1.5 mm or less and more preferably 1.0 mm or less.

In addition, if the warpage is 0 $\mu$m/mm or more and less than 2 $\mu$m/mm and the local waviness height is 0 $\mu$m or more and 75 $\mu$m or less, the sufficient flatness of the aluminum nitride substrate can be ensured. Therefore, it is possible to prevent the occurrence of defects in the screen printing method as described above. Also, the warpage is preferably less than 1.5 $\mu$m/mm and more preferably less than 1.0 $\mu$m/mm. The waviness height is preferably 50 $\mu$m or less.

The aluminum nitride sintered body according to the first aspect of the present invention may have the thermal conductivity ranging from 50 W/m·K to 250 W/m·K.

In such a case, when the present aluminum nitride sintered body is used as a substrate of a heater, it is possible to achieve proper heat diffusion over the entire portion of the substrate and to reduce the risk of other members (such as electrode part or control circuit, etc.) formed on the substrate being affected adversely by heat generated from a heating element (the heating element formed on the surface of the substrate) constituting the heater. If the thermal conductivity of the substrate composed of the aluminum nitride sintered body is less than 85 W/m·K, thermal conductivity of the substrate made of the aluminum nitride sintered body is excessively small and hence heat diffusion from the heating element over the entire substrate becomes insufficient, thereby making a difficulty to obtain a uniform distribution of heat over the entire portion of the substrate. Also, if the thermal conductivity of the aluminum nitride sintered body exceeds 105 W/m·K, it may cause a risk of overheating of other members such as the electrode part and control circuits, etc. mounted on the substrate, due to the heat from the heating element. As a result thereof, the other members are at risk of damage due to overheating.

A metallized substrate according to another (the second) aspect of the present invention comprises a substrate and a metallized layer. The substrate is a substrate made of the aluminum nitride sintered body formed according to the first aspect of the present invention and has a plate shape (a sheet shape). The metallized layer is typically formed on at least a part of the surface of the substrate. And the metallized layer has electric conductivity.

The metallized substrate according to another (the third) aspect of the present invention comprises a substrate including the aluminum nitride sintered body and a metallized layer. The substrate has a maximum length of 320 mm or more, a thickness of more than 0 mm and 2 mm or less, and the local waviness height of 0 $\mu$m or more and 75 $\mu$m or less. The metallized layer is formed on at least a part of the surface of the substrate. The metallized layer has electric conductivity. The metallized substrate according to the above aspect of the present invention has the warpage value ranging from 0 $\mu$m/mm to 5 $\mu$m/mm. Also, the metallized layer may be a layer containing metal or a layer comprising other materials with electric conductivity.

Thus, it is possible to obtain metallized substrates with larger dimensions and superior flatness as compared with conventional metallized substrates. Therefore, by using the metallized substrate of the present invention, it is possible to produce electronic parts with large sizes. Further, in the case of producing electronic parts with relatively small sizes by dividing the metallized substrate according to the present invention, it is possible to increase the number of the electronic parts, thereby reducing costs for producing the electronic parts.

Further, if the aluminum nitride sintered body forming the metallized substrate has the maximum length of 320 mm or more, it is possible to obtain metallized substrates with larger dimensions than conventional ones. Also, if the sintered body has the thickness of more than 0 mm and 2 mm or less, it is suitable for use as a metallized substrate and hence shows excellent properties as the substrate of an electronic apparatus, the substrate for a heater, etc. Further, in the case where the local waviness height is within a range of 0 $\mu$m or more and 75 $\mu$m or less and the warp is within a range of 0 $\mu$m/mm or more and less than 5 $\mu$m/mm, it is possible to reduce the probable occurrence of accidents such as cracking of the substrate even in the case where the metallized substrate or the heater is employed under a condition of applied mechanical load (load).

In addition, the aluminum nitride sintered body according to the first aspect of the present invention and the aluminum nitride sintered body to construct the substrate contained in the metallized substrate according to the other the third aspect of the present invention are preferably produced according to the following procedure. That is, before a step to remove a binder included in a molded body made of a mixture of raw materials containing a binder and aluminum nitride (the binder removing step), a step of naturally drying the molded body for 10 hour or more is performed, followed by the above binder removing step and a sintering step. The time required for the natural drying is more preferably 20 hours or more. The aluminum nitride sintered body is produced by arranging the molded body in a space surrounded by a jig principally comprising boron nitride; then sintering the arranged body under a condition where the ratio of the volume of the molded body before sintering to the volume of the space is neither less than 10% nor more than 70%.

The heater according to another aspect (the fourth) of the present invention comprises the metallized substrate according to the second aspect or the third aspect of the present invention, an electrode part, and an insulating layer. The electrode part is arranged on the surface of the substrate which constitutes the metallized substrate and is connected to the metallized layer. The insulating layer is provided on the top surface of the metallized layer. The metallized layer functions as a heating element by being supplied with electrical current from the electrode part.

Thus, by using the metallized substrate of the present invention, it is possible to produce a heater having a larger area and superior flatness as compared with conventional heaters. Also, by dividing the heater of the present invention into parts, heaters of a relatively smaller size can be produced. In such a case, since the number of the heaters obtainable from a single metallized substrate can be increased, the production cost of the heaters can be reduced.

A method of producing the aluminum nitride sintered body according to another (the fifth) aspect of the present invention comprises a step of preparing a raw material containing a binder and aluminum nitride as the major raw material. The method further comprises a step of producing a sheet-shaped molded body by using the raw material. Further, a drying step of naturally drying the molded body for 10 hour or more is performed, followed by a step of removing the binder from the dried molded body. Afterward, a sintering step is performed so that the molded body free of the binder is sintered. The natural drying is performed more preferably for 10 hours or more, and most preferably for 20 hours or more.

By performing the above procedures, because the drying step is conducted between the step of producing the molded body and the step of removing the binder (the binder removing step), a solvent, moisture, etc. slowly and sufficiently volatilize out of the whole molded body by the drying step. Thus, the molded body contracts almost uniformly over the entire portion thereof as a result of volatilization of the solvent and moisture. As a result, the generation of distortion and internal stress caused by the volatilization of the solvent and moisture can be controlled. Accordingly, during the binder removing step and the sintering step as post-steps, it is possible to prevent deformation such as warpage or waviness in the molded body or the sintered body.

In addition, when the natural drying time in the drying step is 10 hour or more, moisture or the like can be uniformly and sufficiently volatilized out of the entire portion of the molded body at relatively low speed.

With respect to the method of producing the aluminum nitride sintered body according to the fifth aspect of the present invention, the sintering step comprises sintering the molded body under a condition that the molded body is arranged in the space surrounded by the jig comprising boron nitride as the major component. Preferably, the ratio of the volume of the molded body before sintering to the volume of the space surrounded by the above jig ranges from 10% to 70%, more preferably from 20% to 60%.

In this case, since the molded body is sintered in a state of being arranged within the space surrounded (substantially closed) by the jig, it is possible to reduce a risk of generating a local flow of atmospheric gas near the molded body during the sintering step. Thus, the risk of adverse effects on the shape of the molded body (the sintered body) caused depending on the condition of the atmospheric gas can be reduced.

Also, if the ratio of the volume of the molded body to the volume of the space surrounded by the jig (the volume of a region including the molded body) is in the range described above, partial pressures of components of the atmospheric gases around the molded body (for example, the partial pressure of an atmospheric gas containing nitrogen and carbon when the gas contains nitrogen ($N_2$) or carbon (CO, $CO_2$, etc.)) can be appropriately controlled. Therefore, it is possible to reduce the risk of adverse effects on the shape of the molded body (to generate the warpage or waviness) by the components of the atmospheric gas.

A method of producing the aluminum nitride sintered body according to another (the sixth) aspect of the present invention comprises a step of preparing a sheet-shaped molded body containing the aluminum nitride as a major component. The method further comprises a step of sintering the molded body under a condition of arranging a single molded body in a space surrounded by a jig containing boron nitride as the major component.

In this case, because the molded body is sintered in a state of being arranged within the space surrounded (substantially closed) by the jig, it is possible to reduce excess inflow of the atmospheric gas from the outside of the jig to a region near the molded body during the sintering step. Thus, the risk of adverse effects on the shape of the molded body (the sintered body) caused depending on the condition of the atmospheric gas can be reduced.

Additionally, since a single molded body is arranged in the substantially closed space surrounded by the jig and is sintered, it is possible to reduce the probable occurrence of a risk such that the shape deformation of the molded body is caused by the interaction between a plurality of molded bodies such as contraction of the body during sintering due to the presence of other molded bodies that are piled up, for example, as in the case where the plurality of molded bodies are piled up and sintered.

With respect to the above-described method of producing the aluminum nitride sintered body according to the sixth aspect of the present invention, the ratio of the volume of the molded body before sintering to the volume of the space surrounded by the above jig may range from 10% to 70%.

Herein, if the ratio of the volume of the molded body to the volume (the volume of a region including the molded body) of the space surrounded by the jig is in the range described above, partial pressures of components of the atmospheric gas near the molded body can be appropriately controlled. Therefore, it is possible to reduce the risk of adversely affecting the shape of the molded body by the components of the atmospheric gas.

Further, in the method of producing the aluminum nitride sintered body according to the fifth aspect or the sixth aspect of the present invention, the ratio of the volume of the molded body before sintering to the volume of the space surrounded by the above jig preferably ranges from 20% to 60%.

With respect to the method of producing the aluminum nitride sintered body according to the fifth aspect or the sixth aspect of the present invention, the jig may have a depressed portion to receive the molded body on the top surface of a flat base. In the sintering step, each of the plurality of molded bodies may be placed in the depressed portion in each of a plurality of jigs and, the plurality of jigs may be piled up so that sintering can be performed.

In this case, by placing one molded body in the depressed portion of each jig, and by piling up the plurality of jigs, it is possible to arrange each molded body in a space surrounded (substantially closed) by the wall of the depressed portion of one jig and a bottom face of another jig piled up over the jig. Also, by using the plurality of jigs in such a piled-up manner, a plurality of molded bodies can be sintered at once in a state where each of the plurality of molded bodies is placed in the substantially closed space. Accordingly, it is possible to increase the efficiency of manufacturing step of aluminum nitride sintered bodies.

In addition, by altering the shape and depth of the depressed portion of each jig suitably according to the size and dimensions of the molded body, it is possible to modify arbitrarily the ratio of the volume of the molded body before sintering to the volume of the space surrounded (closed space) by the above-described jigs.

With respect to the method of producing the aluminum nitride sintered bodies according to the fifth or the sixth aspect of the present invention, the sintering step may be performed in a state in which jigs are stacked and the stacked jigs are placed inside a case made of metals such as molybdenum (Mo), tungsten (W) or the like.

In this case, it is possible to more definitely reduce a risk of excess inflow of the atmospheric gas from the outside of the jigs into the space near the molded body during the sintering step. Therefore, it is possible to reduce possibilities of occurrence of deformation such as warpages in the aluminum nitride sintered body due to the excess inflow of the atmospheric gas.

The jig according to another (the seventh) aspect of the present invention, which is used in the sintering step to produce the aluminum nitride sintered body, has a base that contains boron nitride. The base has a flat plate form and has a groove portion on a surface thereof to receive the molded body that is to be the aluminum nitride sintered body. The dimensions of the depressed portion are determined such that the volume ratio of the molded body to the depressed portion is within a range of 10% to 70%.

By employing such jig, the sintering step in the method of producing the aluminum nitride sintered body according to the second aspect or the third aspect of the present invention can easily be conducted. That is, by first preparing a plurality of jigs and arranging each of the molded bodies in the depressed portion of each jig, and then performing sintering by piling up the plurality of jigs, the molded bodies can be sintered in a state wherein each of the molded bodies is arranged in a space surrounded by these jigs (the space surrounded by the wall of the depressed portion of one jig and the bottom of another jig that is stacked on the jig).

Furthermore, by properly altering the shape or the depth of the depressed portion of the jig, the ratio between the volume of the space and that of the molded body can arbitrarily be changed.

Further, if the ratio of the volume of the molded body to that of the space is within the range described above, the partial pressures of components of the atmospheric gas around the molded body can properly be adjusted during the sintering step.

BEST MODE FOR CARRYING OUT THE INVENTION

Figure 1:
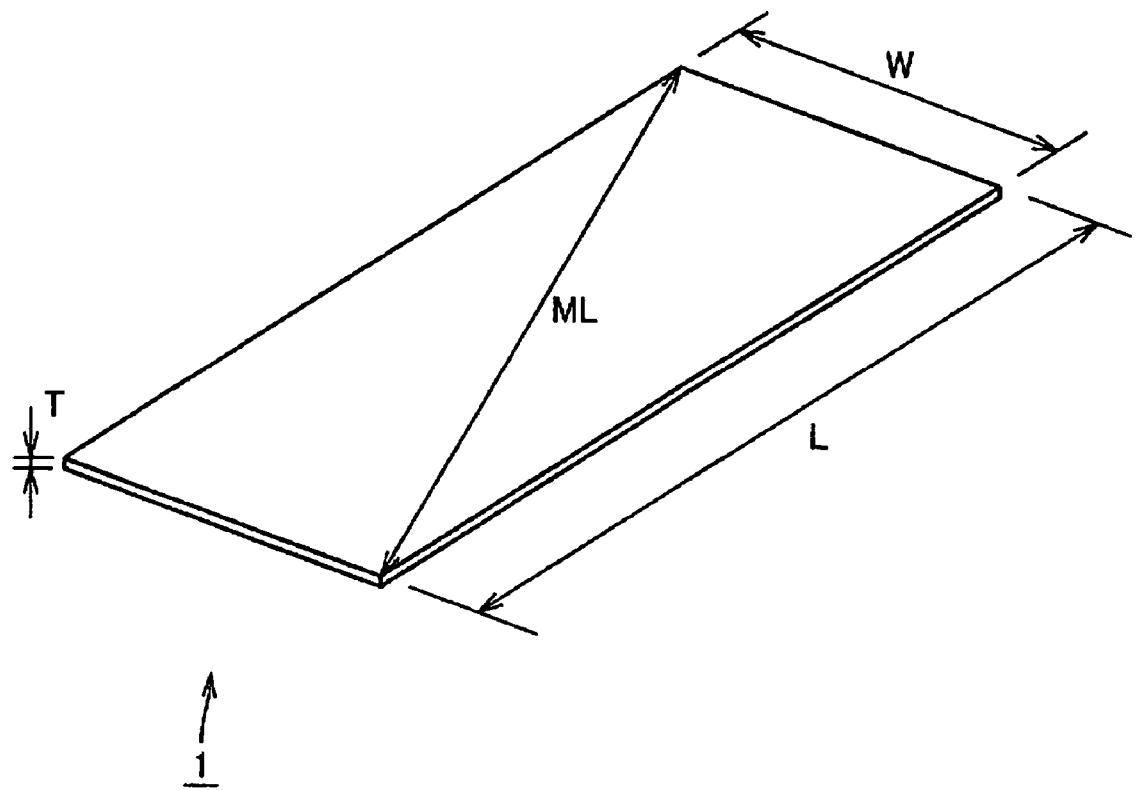
FIG. 1 is a schematic perspective view illustrating embodiment 1 of an aluminum nitride sintered body according to the present invention.

Hereafter, the present invention will be described in more detail by reference to the accompanying figures. In the figures, the same reference numeral is attached to the same or equivalent part, and the explanation thereof is not repeated.

FIRST EMBODIMENT

Figure 2:
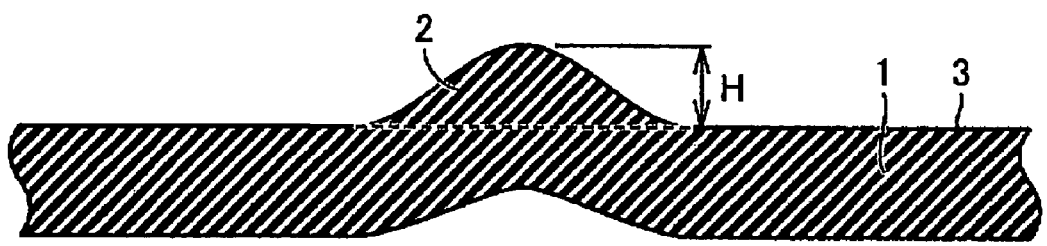
FIG. 2 is a schematic sectional view explaining the waviness height of the aluminum nitride sintered body shown in FIG. 1.
Figure 3:
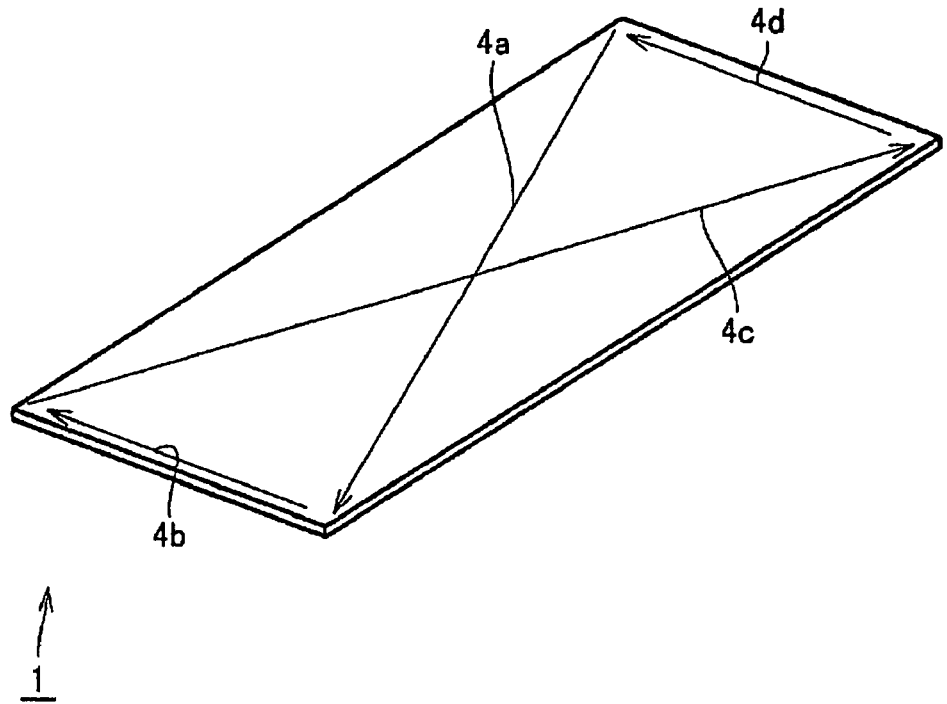
FIG. 3 is a schematic perspective view explaining the warpage of the aluminum nitride sintered body shown in FIG. 1.

FIG. 1 is a schematic perspective view illustrating a first embodiment of an aluminum nitride sintered body according to the present invention. FIG. 2 is a schematic sectional view explaining the waviness height of the aluminum nitride sintered body shown in FIG. 1. FIG. 3 is a schematic perspective view illustrating the warpage of the aluminum nitride sintered body shown in FIG. 1. With reference to FIGS. 1 to 3, the first embodiment of the present invention for the aluminum nitride substrate will be described in detail.

As shown in FIG. 1, the aluminum nitride sintered body 1 have a rectangular form with length L, width W and thickness T. Maximum length ML of the sintered body 1 (hereinafter also referred to as "substrate") corresponds to a length of a diagonal line on the top surface of the substrate 1.

The maximum length ML of the substrate 1 is equal to 320 mm or more. In this manner, a substrate for electronic apparatuses or a metallized substrate which is greater than conventional ones can be realized. The maximum length ML is preferably not less than 350 mm and, more preferably, 450 mm or more. The thickness T of the substrate 1 is more than 0 mm and 2 mm or less. With this arrangement, the substrate 1 of the present invention can easily be applied to the substrate for a heater or the like. Further, the thickness T is preferably 1.5 mm or less and, more preferably, 1.0 mm or less.

In addition, the waviness height (hereinafter also referred to as waviness) of the substrate 1 shown in FIG. 1 ranges from 0 μm or more to 75 μm or less, more preferably 50 μm or less. As shown in FIG. 2, the waviness height used here refers to a height H of a locally convex portion 2 (a portion waved protruding at the outer surface) on the surface of the substrate 1, wherein the height H is the highest height measured from a substrate surface 3 outside the locally convex portions 2 up to the highest part of the convex portion 2 that is the largest convex (the highest height H) among the displacements measured at a plurality of points of the surface.

The waviness height can easily be determined by measuring the displacement of the surface of the substrate 1 by using a laser displacement meter or a probe type displacement meter. In addition, in the substrate 1, the warpage ranges from 0 μm/mm or more to less than 2 μm/mm. The warpage is preferably less than 1.5 μm/mm and, more preferably, less than 1.0 μm/mm. Here, the warpage can be obtained as described below. That is, as shown in FIG. 3, the displacement of the surface of the substrate 1 is measured along the routes of arrows 4a to 4d by using the laser displacement meter or the probe type displacement meter. Then, from the results of such measurements, the difference between the lowest portion and the highest portion of the surface of the substrate 1 is obtained. Further, the difference is divided by the maximum length ML of the substrate 1 (FIG. 1). As a result, the value of warpage of the substrate 1 is obtained.

As described above, the aluminum nitride sintered body has a large area and simultaneously excellent flatness. Here, a case is considered wherein the substrate 1 is applied to a substrate to construct electronic parts such as a laser printer and/or a heater in a copying machine. In the case where an electrode or heating element of the heater, etc. is to be formed on the surface of the substrate 1 by using a screen printing method, the heating element or the like cannot occasionally be formed properly on the substrate 1 if a warp or the like of the substrate 1 exists. However, with the substrate 1 of the present invention, it is possible to accurately print an electric conductive paste (which is to be formed as a heating element) or the like by using the screen printing method, because the substrate 1 has excellent flatness. Therefore, it is possible to prevent the occurrence of problems such as formation failure of the heating element or the like.

Further, if the substrate 1 is warped or curved during screen printing, problems may occur such as cracks in the substrate 1 or damage of the screen. However, by using the substrate 1 of the present invention, it is possible to prevent the occurrence of such problems. As a result, it is possible to reduce the cost of production of the heater or the like.

Further, if the aluminum nitride sintered body of the present invention is employed, a metallized substrate or a heater having a large area can easily be produced. The plane form of the sintered body may not be limited to the rectangular form as shown in FIG. 1.

The sintered body 1 according to an embodiment of the present invention shown in FIG. 1 has a thermal conductivity within a range of 85 W/m·K to 105 W/m·K when it is applied to a heater. Also, the aluminum nitride sintered body of the present invention can adopt a bar-shaped form. From the above-described reasons, heat diffusion over the entire portion of the substrate 1 can be made sufficiently fast, and simultaneously, and at the same time it is possible to prevent the occurrence of problems such that the electrode part which supplies electric current to the heating element constituting the heater is damaged by heat from the heater.

The surface roughness of the sintered body 1 is defined as Ra and, preferably 1.0 μm or less, and more preferably 0.4 μm or less. With such Ra, when the heating element to constitute the heater or the metallized layer or the like is formed on the surface of the substrate 1, the adhesiveness between the heating element or the metallized layer and the surface of the substrate 1 can be enhanced.

Also, the transverse rupture strength of the sintered body 1 is preferably 200 MPa or more in terms of the three-point bending strength. With this strength, in the case where the surface of the substrate 1 is treated for forming the metallized layer or the like, and in the case where the metallized substrate or the heater is used under the condition of applied mechanical load, the occurrence probability of accidents such as cracks in the sintered body 1 can be reduced.

Figure 4:
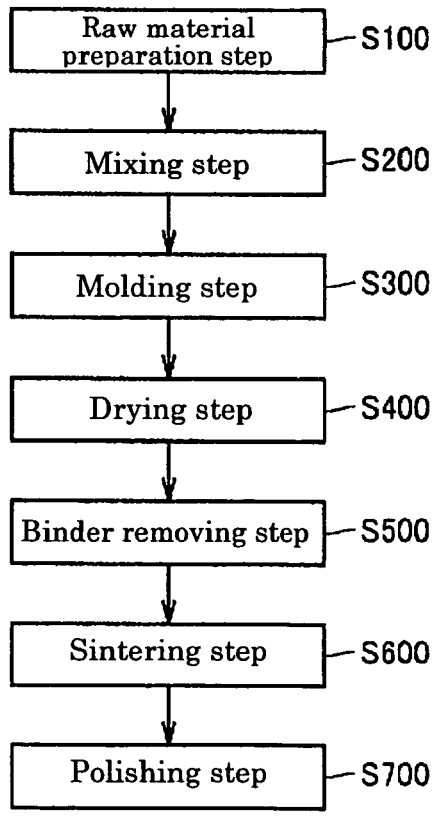
FIG. 4 shows a flow chart explaining the method of producing the aluminum nitride sintered body shown in FIG. 1.
Figure 5:
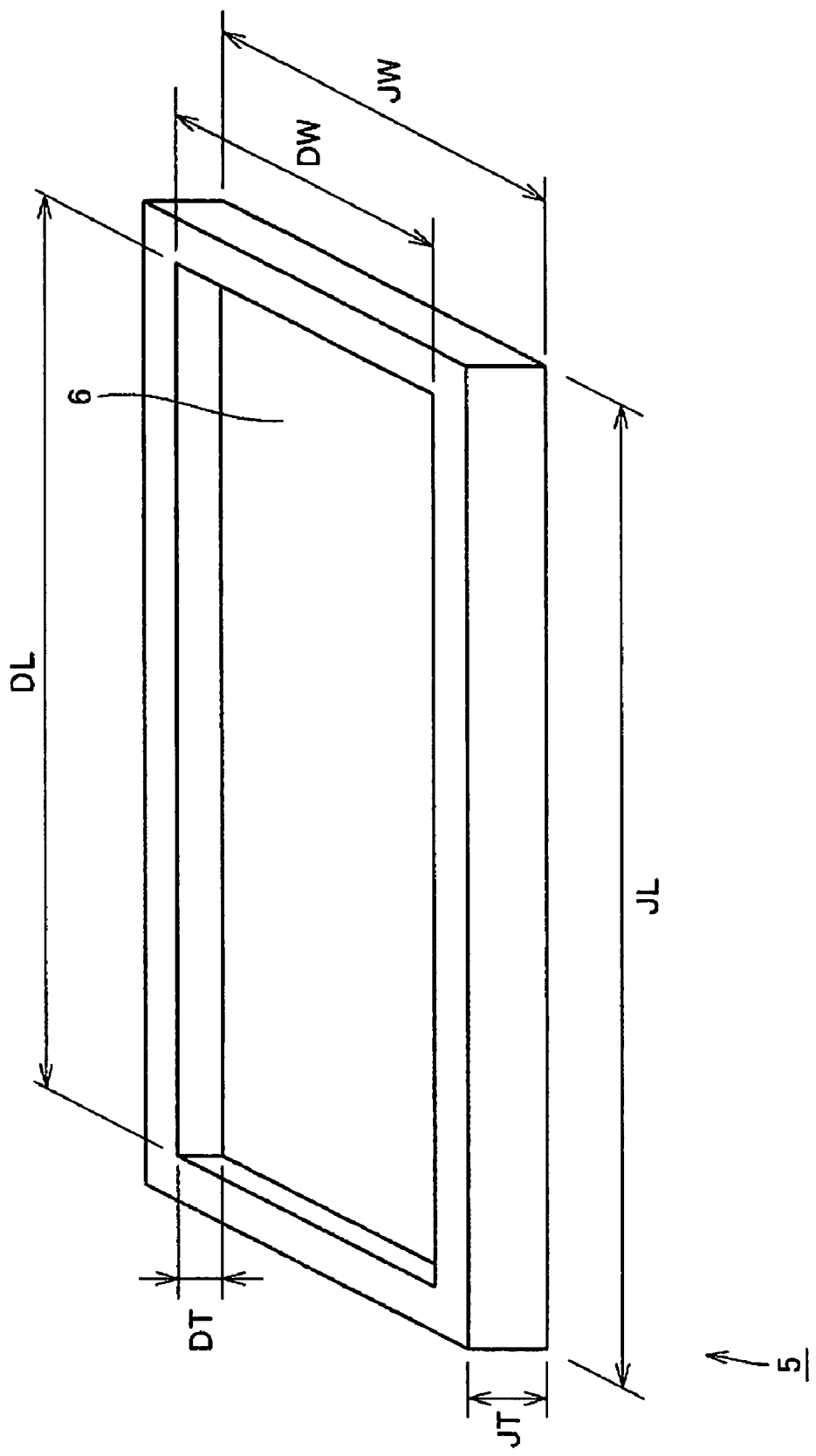
FIG. 5 is a schematic perspective view illustrating a jig used in the sintering step shown in FIG. 4.
Figure 6:
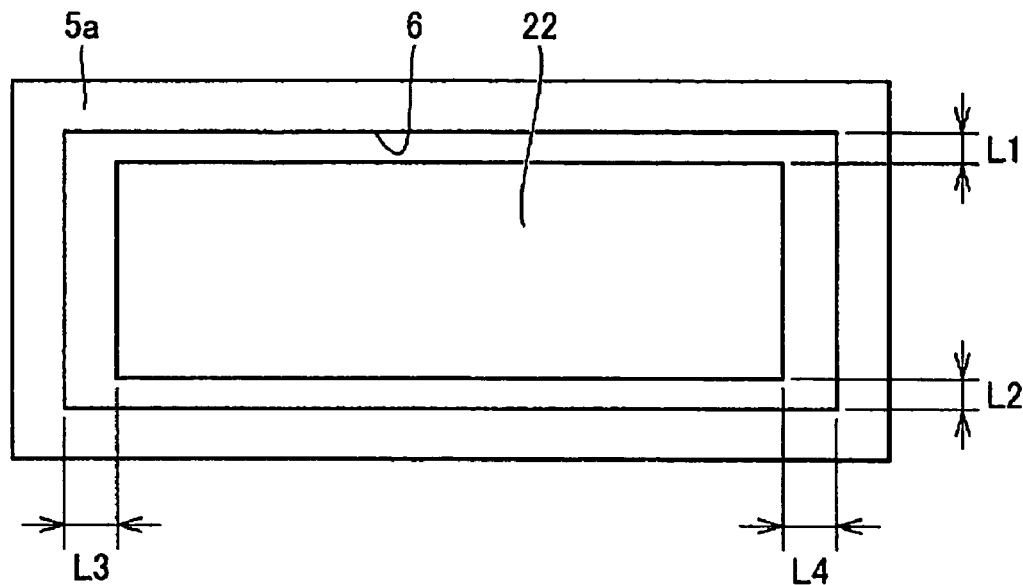
FIG. 6 is a schematic plane view illustrating a state in which a molded body is mounted in the depressed portion of the jig before the sintering step.
Figure 7:
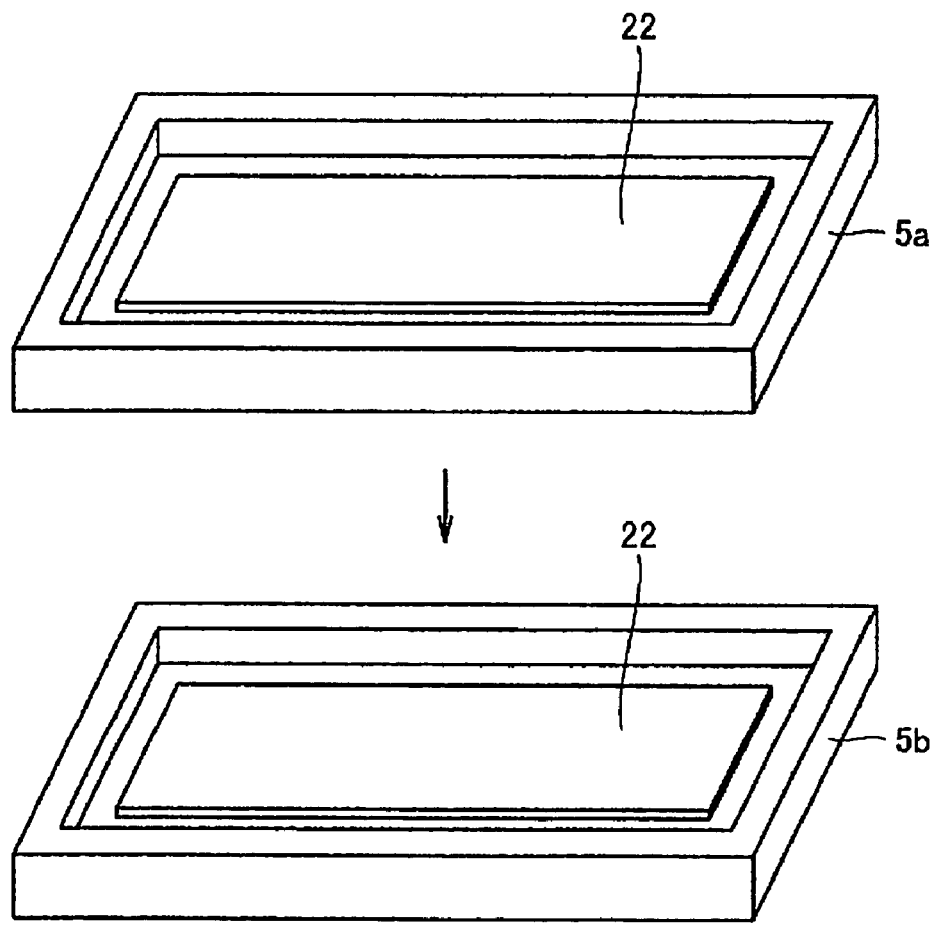
FIG. 7 is a schematic perspective view illustrating a jig in which a molded body mounted as shown in FIG. 6 is being stacked onto another of such a jig.
Figure 8:
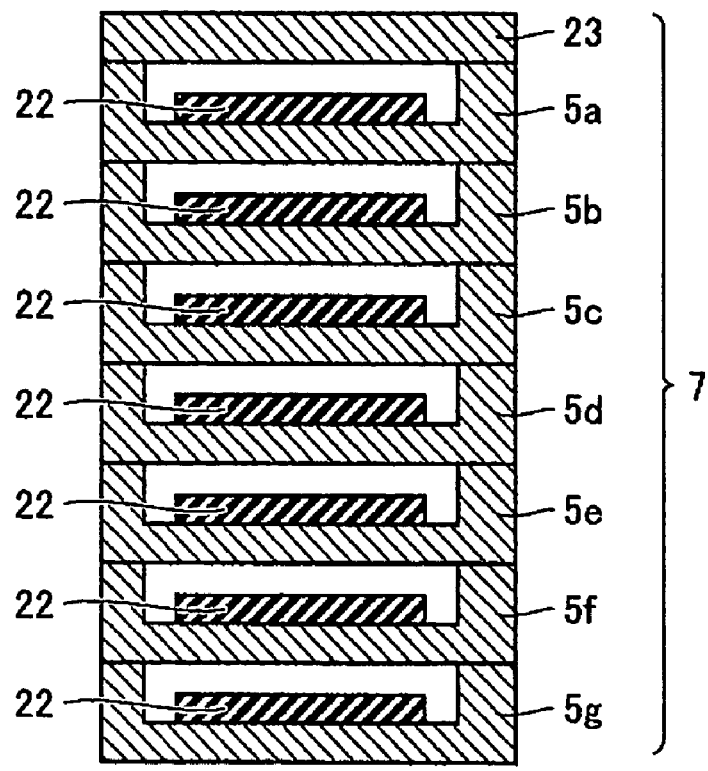
FIG. 8 is a schematic sectional view illustrating the jig pile formed by piling up a plurality of jigs as shown in FIG. 7.
Figure 9:
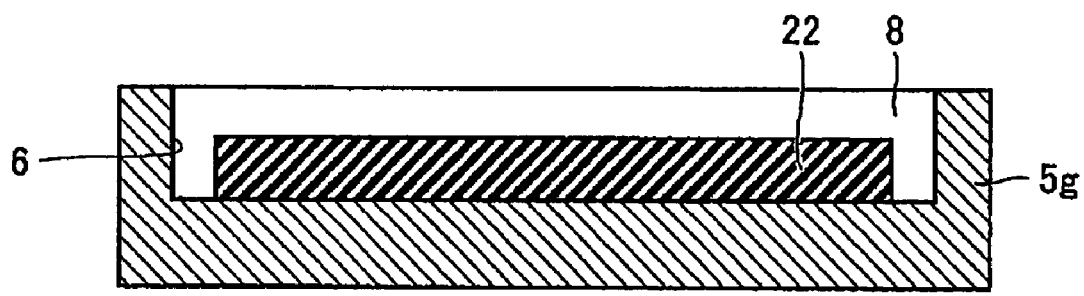
FIG. 9 is an enlarged schematic view illustrating one of the jigs of the jig pile shown in FIG. 8.
Figure 10:
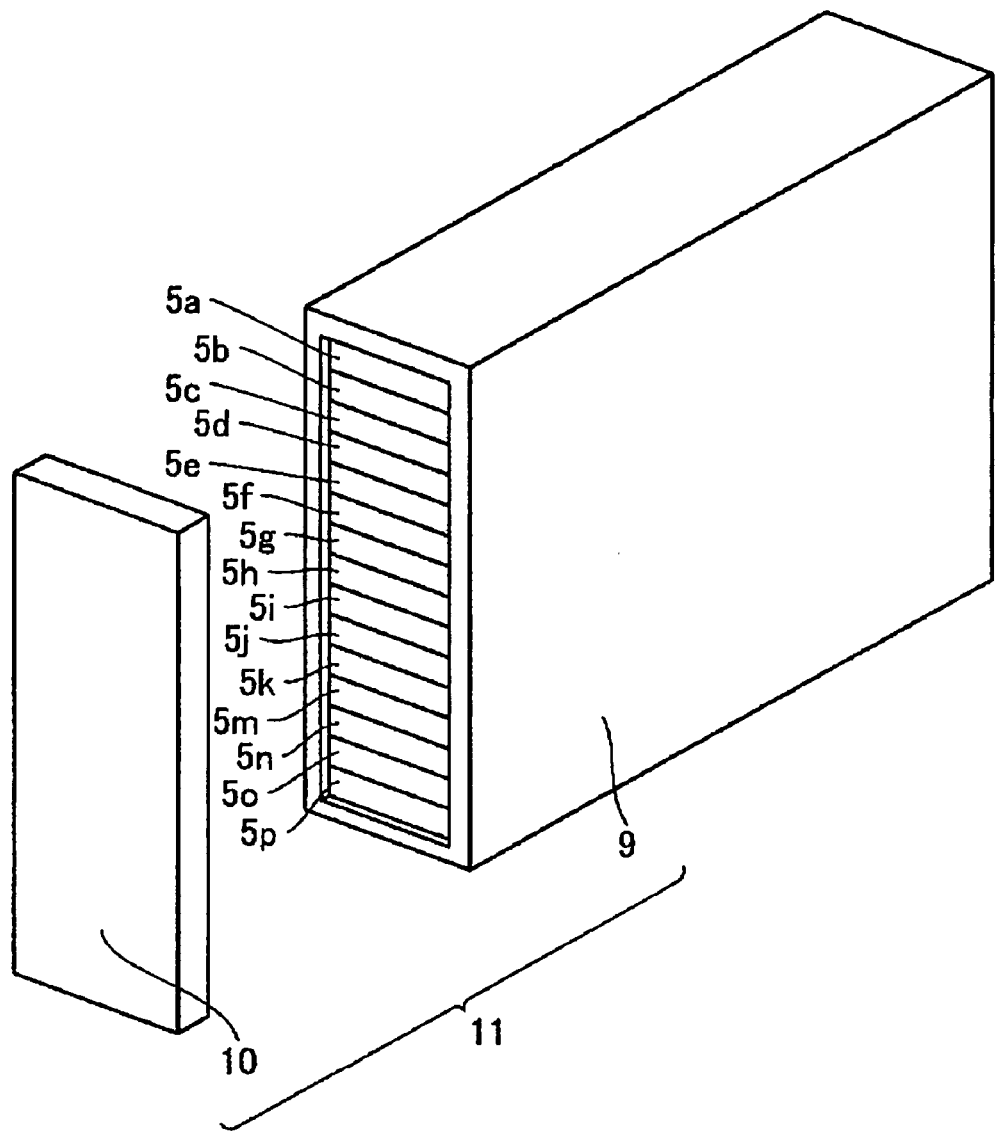
FIG. 10 is a schematic perspective view illustrating a state of the jig pile shown in FIG. 8 that is placed in a metal case.

Next, with reference to FIGS. 4 to 10, a method of producing the aluminum nitride sintered body shown in FIG. 1 is described. FIG. 4 shows a flow chart explaining the method of producing the substrate shown in FIG. 1. FIG. 5 is a schematic perspective view illustrating the jig used in the sintering step shown in FIG. 4. FIG. 6 is a schematic plane view illustrating a state of the molded body mounted in the groove portion of the jig before the sintering step. FIG. 7 is a schematic perspective view illustrating a state of piling up of the jig mounted with the molded body shown in FIG. 6. FIG. 8 is a schematic sectional view illustrating the jig pile formed by piling up a plurality of jigs shown in FIG. 7. FIG. 9 is an enlarged schematic view illustrating one of the jigs in the jig pile shown in FIG. 8. FIG. 10 is a schematic perspective view illustrating a state of the jig pile shown in FIG. 8 that is placed in a metal case.

As shown in FIG. 4, the method of producing the substrate 1 shown in FIG. 1 comprises a step of preparing a raw material (S100). In the raw material preparing step (S100), the raw material including aluminum nitride powder as the major component of the substrate 1, and other materials such as an aid (sintering aid) or a binder are prepared. As the aluminum nitride powder, commercially available aluminum nitride powder may be used. For example, the aluminum nitride powder may have an average particle diameter ranging from 0.1 μm to 5 μm. Also, the aluminum nitride powder may have an oxygen content ranging from 0.1% to 2.0% and a carbon content equal to 1,000 ppm or less. Further, the aluminum nitride powder may have a specific surface area ranging from 1.0 m$^2$/g to 5.0 m$^2$/g.

For the aid (the sintering aid), a material comprising at least one of elements belonging to Group 2A or 3A of the periodic table of elements may be used. For example, it may comprise $Y_2O_3$, $Yb_2O_3$, $Nd_2O_3$, CaO, etc. An amount of the aid to be combined to the raw material is preferably determined such that the content of the Group 2A or 3A elements contained in the substrate 1 may be within the range of 0.1% by weight to 10% by weight.

With the use of such aids, the sintering temperature may be reduced, and simultaneously the average particle diameter of the aluminum nitride in the substrate 1 to be formed (FIG. 1) can be decreased. Accordingly, in the case where the substrate 1 is used for a heater, it is possible to improve the wettability of the heating element to the surface of the substrate 1 when a heating element such as a metal is formed on the surface of the substrate 1. In such case, tungsten, molybdenum, silver or silver alloys for example preferably are used as a material for the heating element.

The aid may contain silicon (Si) or aluminum (Al). If the aids comprising these components are used, the substrate formed may consequently include aluminum oxides, silicon or silicon compounds. The aluminum oxides etc. have an effect of improving adhesiveness between the metallized layer and the substrate 1, when the metallized layer is formed on the surface of the substrate 1. Also, in order to reduce irregular color of the substrate 1, the aid may contain at least one of transition elements. As for the binder, acryl, polyvinylbutyral or cellulose based binder, etc. can be adopted as a binder that uses an organic solvent as a dispersion medium.

Also, polyvinyl alcohol, acryl, urethane or vinyl acetate based binder, etc. can be adopted as a binder that uses water as the dispersion medium. Furthermore, other supplements such as a dispersant or a plasticizer can be added to the raw material in order to enhance the stability of a slurry (a liquid obtained by mixing the above-mentioned raw material, solvent, etc.), the dispersibility of ceramic particles (aluminum nitride, etc.), or the flexibility of green sheet formed of the slurry.

Next, a mixing step (S200) is conducted (FIG. 4). In the mixing step (S200), the above-mentioned raw material, aid, solvent, plasticizer, and/or dispersant are blended so as to produce a raw mixture such as a slurry. The mixing step may employ typical mixing methods such as ball-mill mixing. The above-mentioned preparing step (S100) and the mixing step (S200) together correspond to the step for preparing the raw material.

Next, a molding step (S300) is conducted (FIG. 4). The molding step (S300) is to form or to prepare a sheet-shaped molded body and produces the sheet form molded body that is to be the substrate 1 (FIG. 1). Herein, conventional methods such as doctor-blade method, extrusion, roll-compaction method, etc. may be used to prepare the molded body.

Next, a drying step (S400, FIG. 4) is conducted, in which natural drying of a molded body is performed in a state where the molded body is placed on a mesh tray made of stainless steel with a flat surface. The time used for the drying step is not less than 10 hour. The natural drying time is preferably 20 hours or more. Also, such natural drying step is preferably conducted at the atmospheric temperature ranging from 0° C. to 40° C., and more preferably from 15° C. to 25° C.

Under the above conditions, the solvent or moisture contained in the molded body can be volatilized out of the entire portion of the molded body at a relatively low speed. As a result, contraction of the molded body due to the drying step can uniformly occur over the entire molded body. Accordingly, substantially no deflection is generated within the sheet-shaped molded body, and it is possible to reduce the possible occurrence of warpage or waviness of the molded body or the sintered substrate in post-processes such as a binder removing step (S500) (FIG. 4) and a sintering step (S600) (FIG. 4).

Next, the binder removing step (S500, FIG. 4) is conducted. Naturally dried molded bodies are heated for a predetermined time in a state where each molded body is placed in a depressed portion 6 (FIG. 5) of a jig 5 (FIG. 5) which is used in the sintering step (S600) described hereinafter. As a result, the binder can be volatilized and removed from the molded body. The heating conditions may be such that the heating temperature is within the range of 400° C. to 900° C. and the heating time is within the range of 5 hours to 200 hours.

Next, the sintering step (S600) (FIG. 4) is conducted. The heating furnace such as an all-carbon furnace or an all-metal furnace, or a combination thereof may be used as a heating furnace used in the sintering step (S600). The heating furnace preferably is an all-metal furnace. The term "all-metal furnace" as used herein refers to a heating furnace whose heater, heating chamber and the like (except for the jig shown in FIG. 5) are constituted by a high-melting point metal material such as molybdenum (Mo) or tungsten (W). By employing the all-metal furnace, it is possible to prevent the atmosphere in the heating chamber from changing to an atmosphere excessively containing carbon during the sintering step. On the other hand, when the all-carbon furnace (the furnace using a carbon based material for the heater or the heating chamber as a constructional material in the heating furnace) is used for sintering, the atmosphere in the heating chamber is altered into the atmosphere containing carbon during the sintering step. And, oxygen derived from the molded body to be sintered reacts with carbon in the carbon-containing atmosphere inside the heating chamber, resulting in the generation of carbon monoxide and carbon dioxide. In this case, the present inventors found from experimental results that deflection such as warpage or irregular color is prone to be generated in the sintered body. However, by performing sintering by using the all-metal furnace, the above problem can be prevented.

As for the conditions of the sintering step (S600), the sintering temperature may be within the range of 1,600° C. to 1,900° C., the atmosphere may be a nitrogen atmosphere at normal pressure, and the sintering time may be within the range of 3 hours to 100 hours.

In the method of producing the substrate 1 shown in FIG. 1, the molded body to be sintered is mounted in the jig shown in FIG. 5 during the sintering step (S600) (FIG. 4). As shown in FIG. 5, the jig 5 is made of boron nitride (BN) and comprises a base having substantially a plate shape and a groove portion 6 on the top surface of the base. More specifically, the jig 5 is a plate having the length JL, width JW and height JT, and has the groove portion 6 of the length DL, width DW and depth DT on the top surface. The groove portion 6 is used for arranging the molded body to be sintered inside it.

After preparing a plurality of such jigs 5, a molded body 22 is arranged in the depressed portion 6 of each jig 5 as shown in FIG. 6. In this case, distances L1 to L4 between the side walls of the depressed portion 6 of the jig 5 and the molded body 22 may be about 5 mm, respectively. And, the molded bodies 22 are each arranged in the depressed portion 6 of each of the prepared jigs 5a (FIG. 6). Further, as shown in FIG. 7, the jig 5a, in whose depressed portion a molded body 22 is arranged, is piled up on another jig 5b having another molded body 22 similarly arranged in the depressed portion thereof. Likewise, the plurality of jigs are piled up in order as shown in FIG. 7. Also, a cover 23 made of boron nitride, the same material as the jig 5a, is placed on top of the uppermost one of the jigs 5a thus piled up (FIG. 8). As a result, a jig pile 7 can be formed with the plurality of jigs 5a to 5g each containing the molded body 22 arranged inside the groove portion, and the cover 23 as shown in FIG. 8.

Since there is no particular member to press the molded bodies 22 arranged inside the depressed portions of the jigs 5a~5g as shown in FIG. 8, the molded bodies 22 are affected only by self-weight applied thereto. Also, for each of the jigs 5a to 5g, the surface of the bottom and side walls of the depressed portion to hold the molded body 22 is preferably polished before mounting the molded body 22 therein. In particular, the surface of the bottom wall of the depressed portion 6 (FIG. 6) may be polished to ensure substantial flatness to some extent. Also by this polishing step, it is possible to eliminate foreign matter having adhered to the inner wall of the depressed portion 6 (FIG. 6) of the jigs 5a to 5g which have already been used once during the sintering step of molded bodies 22.

In the jig pile 7, by piling up the jigs 5a to 5g as shown in FIG. 8, an inner space 8 (FIG. 9) of the depressed portion holding the molded body 22 can be made into a substantially closed space (closed space) isolated from the outer space of the jig pile 7. Thus, as shown in FIG. 9, the molded body 22 is placed in the inner space 8 of the depressed portion 6, which is a closed space (a space surrounded by the wall of the depressed portion 6 of the jig 5g and the bottom wall of the jig 5f piled up on the jig 5g (FIG. 8)). In the sintering step (S600) according to one embodiment of the present invention (FIG. 4), the ratio of the volume of the molded body 22 before the sinter step to the volume of the space 8 without having the molded body 22 is designed to be within the range of 10% to 70%. That is, the dimensions of the depressed portion 6 of each of the jigs 5a to 5g are determined such that the above-mentioned ratio is within the range of 10% to 70%. Also, the ratio preferably ranges from 20% to 60%. In addition, by altering the dimensions of the groove portion 6, the ratio can be arbitrarily changed according to the molded body.

In this manner, by rendering the space 8 holding one molded body 22 to a closed space substantially isolated from the outer space of the jig pile 7 (FIG. 4), it is possible to prevent excessive inflow of the atmospheric gas during sintering (for example, nitrogen gas) from the outside of the jig pile into the space 8 during the sintering step. As a result, it is possible to reduce the risk of the atmospheric gas flow to adversely affect the shape of the molded body 22. Additionally, by keeping the ratio of the volume of the molded body 22 to the volume of the substantially closed space 8 within the above range, partial pressures of components of the atmospheric gas inside the space 8 (for example, partial pressure of a gas containing nitrogen and carbon) can be properly adjusted. As a result, the warpage or waviness height of the substrate 1 caused by the sintering step (FIG. 1) can be reduced.

Also, the jig pile having the jigs 5a to 5k and 5m to 5p is placed inside a metal case 11 for a case made of metal as shown in FIG. 10. Here, the metal case 11 comprises a main body 9 and a cover 10. The jig pile is inserted inside the main metal case body 9. Also, the cover 10 is arranged to close an opening portion for placing the jig pile having the jigs 5a to 5k and 5m to 5p inside the main metal case body 9. As a material to constitute the metal case 11, molybdenum (Mo), for example, may be used.

And, in a state where the metal case is placed inside the heating furnace, sintering of the molded bodies 22 is performed (FIG. 8). As a result, it is possible to better reduce the risk of excessive inflow of the atmospheric gas around the molded bodies 22 (FIG. 8). Accordingly, it is possible to sinter the molded bodies 22 in a state where almost no warpage or the like is caused.

Also, although the thickness of the aluminum nitride sintered body according to the present invention is set as 2 mm or less in the above description, by applying the production method as described above, almost no warpage is generated even if the thickness T of the substrate 1 (FIG. 1) is 1 mm or less. Typically, the thinner the thickness T the more prone to generate warpage in the substrate 1. However, the generation of such warpage can be prevented by the present invention.

Next, as shown in FIG. 4, a polishing step (S700) is conducted. In the polishing step (S700), by polishing the surface of the aluminum nitride sintered body obtained, a desired thickness of the surface is removed. In this way, the substrate 1 as shown in FIG. 1 can be obtained.

Further, surface polishing allowance (chipping allowance) of the substrate obtained in the polishing step (S700) may be 10 µm or less at the surface of one side thereof. It is possible to have this value because warpage or waviness of the sintered body is small according to the present invention. In other words, since the sintered body of the present invention shows sufficiently small warpage or waviness even immediately after the sintering step (S600), it is possible to sufficiently reduce the chipping allowance that is needed to obtain the substrate having the required flatness (value of warpage or waviness height). Furthermore, such polishing step may optionally be eliminated, depending on the applications of the sintered body.

On the other hand, in the case of a sintered body exhibiting relatively large warpage or waviness immediately after the sintering step (S600), the sintering step (S600) has been conducted with the substrate having a larger thickness and the chipping allowance has been increased so as to obtain the required flatness. In such case, since the chipping allowance is increased, it leads to increases of the time required for production and material cost, etc. In contrast, the method for producing the aluminum nitride sintered body according to the present invention can reduce the production cost.

In the polishing step (S700), it is also possible to polish a surface of the sintered substrate by a peripheral circumference of a rotating body having a form of a deformable circular column (or cylindrical form) or having a disc form holding polishing particles. The rotating body comprises any kind of materials provided that it can retain the polishing particles and is deformable. For example, the rotational body comprises woven or non-woven fabrics, plastic foam (such as foamed plastic or sponge), rubber foam (such as sponge rubber), etc. The materials to constitute the rotational body are very easily deformable materials against pressure, compared to conventional polishing materials such as polishing grinder stone, barrel polishing material, etc. Also, the polishing particles supported on the rotating body may comprise conventionally available polishing particles such as alumina, silicon carbide, etc.

By carrying out the polishing step (S700), the surface roughness Ra of the substrate 1 (FIG. 1) can be 1.0 µm or less and the surface roughness Ra preferably 0.4 µm or less. Thus, adhesiveness between the heating element formed on the surface of the substrate 1 and the surface of the substrate 1 can be enhanced when the substrate 1 (FIG. 1) is used as a substrate of a heater, etc.

Additionally, in the case where the substrate 1 shown in FIG. 1 is employed, for example, as a substrate of a ceramic heater, the substrate 1 further comprises any elements belonging to Group 2A and 3A in the periodic table of elements or compounds thereof, in addition to aluminum nitride. In addition, the substrate 1 may contain silicon or silicon compound of 0.01 wt. % to 0.5 wt. % in terms of silicon element. In this case, the substrate 1 may further contain at least one of transition elements or compounds thereof in the range of 0.01 wt. % to 1 wt. % in terms of the corresponding elements.

Group 2A elements or compounds thereof and Group 3A elements or compounds thereof typically function as a sintering aid to promote sintering of aluminum nitride which is a difficult material to be sintered. That is, the elements or compounds thereof form a liquid phase by a reaction of the elements or compounds thereof with oxides (alumina) formed on the surface of particles of the aluminum nitride powder which is the major material of the substrate 1 (FIG. 1). The liquid phase binds the aluminum nitride particles together and consequently promotes the sintering of aluminum nitride. The content of the above elements or compounds thereof may be within a range required for a conventional sintering aid. More specifically, the content of the above elements or compounds thereof is preferably in the range of 0.1 wt. % to 10 wt. % as a total in terms of the element.

In addition, in the sintered body, the aluminum nitride preferably has a small particle diameter. If the particle diameter is small, it is possible to accomplish a uniform and dense distribution of the aid component deposited on the surface of the sintered substrate 1. As a result, when the heating element and the electrode or the like are formed on the surface of the substrate 1, it is possible to obtain improved adhesiveness between the surface of the substrate 1 and the heating element and electrode part, respectively.

On the other hand, if the aluminum nitride particle diameter is relatively large, the surface roughness of the substrate 1 increases. Thus, in the case where the reverse face opposite to the obverse of the substrate 1 on which the heating element is formed is used as a heat conducting face opposing a material to be heated, sometimes a great gap may be formed locally between the heat conducting face (that is, the reverse face) and the material to be heated. As a result, a problem may occur wherein the heat-transfer efficiency from the heater to the material to be heated decreases.

In addition, in the case where the heater and the material to be heated slide against each other, if the aluminum nitride has a larger particle diameter, release of aluminum nitride particles from the surface of the substrate 1 may occur. Also, such released particles may cause damage to the material to be heated. Accordingly, the aluminum nitride particles constituting the substrate 1 preferably have the average particle diameter of 4.0 µm or less, and more preferably 3.0 µm or less.

Here, as the sintering temperature is increased, the growth of particles increases and accordingly the particle diameter of the aluminum nitride particle in the aluminum nitride sintered body of the substrate 1 becomes larger. Thus, in order to reduce the particle diameter of the aluminum nitride particle, it is preferable to reduce the sintering temperature to the minimum. For this purpose, the sintering aid prepared in the raw material preparation step (S100) (FIG. 4) preferably comprises both the elements in Group 2A and Group 3A in the short-form periodic table and compounds thereof together in order to reduce the appearance temperature of the liquid phase described above. As a result, the sintering temperature can be reduced.

In such a case, the elements used in the sintering aid preferably comprise calcium (Ca) of Group 2A and yttrium (Y), neodymium (Nd) and ytterbium (Yb) of Group 3A, or compounds thereof. Particularly, it is preferable to use the elements described above in combination. By employing the sintering aid comprising these elements, the sintering temperature in the sintering step (S600) (FIG. 4) can be decreased to 1,800° C. or less. As a result, it is possible to prepare the aluminum nitride particles in the substrate 1 (FIG. 1) with an average particle diameter 4.0 µm or less.

SECOND EMBODIMENT

Figure 11:
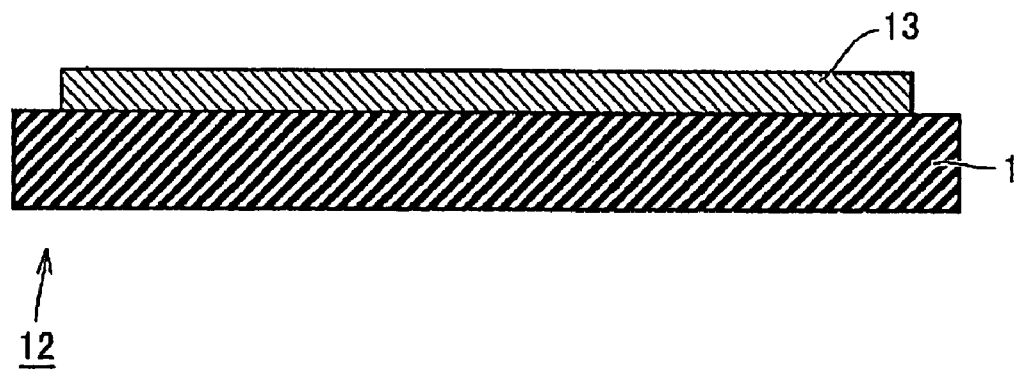
FIG. 11 is a schematic sectional view illustrating a metallized substrate according to the present invention.

FIG. 11 is a schematic perspective view illustrating a metallized substrate according to the present invention. With reference to FIG. 11, the metallized substrate of the present invention will be described.

As shown in FIG. 11, the metallized substrate 12 comprises an aluminum nitride substrate 1 (substrate 1) consisting of an aluminum nitride sintered body made of aluminum nitride as a major component and a metallized layer 13 formed on the surface of the substrate 1. The substrate 1 may be the aluminum nitride sintered body 1 according to the present invention shown in FIG. 1. The metallized substrate 12 has the warpage ranging from 0 µm/mm to 5 µm/mm. The definition of the warpage is identical to that in the substrate 1 of the first embodiment.

In this manner, by forming the metallized substrate 12 using the substrate 1 with a large size having the maximum length ML (FIG. 1) not less than 320 mm shown in FIG. 1, it is possible to manufacture electronic parts in large scale using the metallized substrate 12. Further, it is possible to manufacture small substrates by dividing the large metallized substrate 12 into parts. That is, by cutting the large-sized metallized substrate 12 into small parts, a large number of small substrates are obtainable compared to conventional substrates. Accordingly, it is possible to reduce the production cost for such small substrates and electronic parts using the small substrates.

A metal material constituting the metallized layer 13 can comprise any metal among conventionally available metals, and preferably comprise high-melting point metals. For example, the metallized layer 13 may comprise a layer containing tungsten (W), molybdenum (Mo), or an alloy thereof as the major component.

The method of producing the metallized substrate 12 as shown in FIG. 11 may be any conventional method. More specifically, examples of the production method of the metallized substrate 12 shown in FIG. 11 are a co-firing metallization method and a post-firing metallization method. In the production method of the metallized substrate 12 according to the co-firing metallization method, a paste consisting of high-melting point metals comprising mainly tungsten or molybdenum as a major component is applied to at least a part of the surface of the molded body before the sintering step (S600) shown in FIG. 4. Then, by firing the molded body, which is coated with the paste containing such high-melting point metals as the major component, according to the production method described in the first embodiment of the present invention, the aluminum nitride sintered body is formed, and at the same time, the metallized layer 13 (the high-melting point metallized layer) is formed on the surface of the sintered body.

In the production method of the metallized substrate 12 shown in FIG. 11 according to the post-firing metallization method, a paste mainly containing tungsten, molybdenum and the like as a main component of high-melting point metals is applied onto the surface of the aluminum nitride sintered body after the sintering step (S600) shown in FIG. 4. Then, by further firing the aluminum nitride sintered body coated with the paste, the metallized layer 13 (the high-melting point metallized layer) is formed on the surface of the substrate 1 comprising the aluminum nitride sintered body. Thus, the metallized substrate 12 shown in FIG. 11 can be obtained.

THIRD EMBODIMENT

Figure 12:
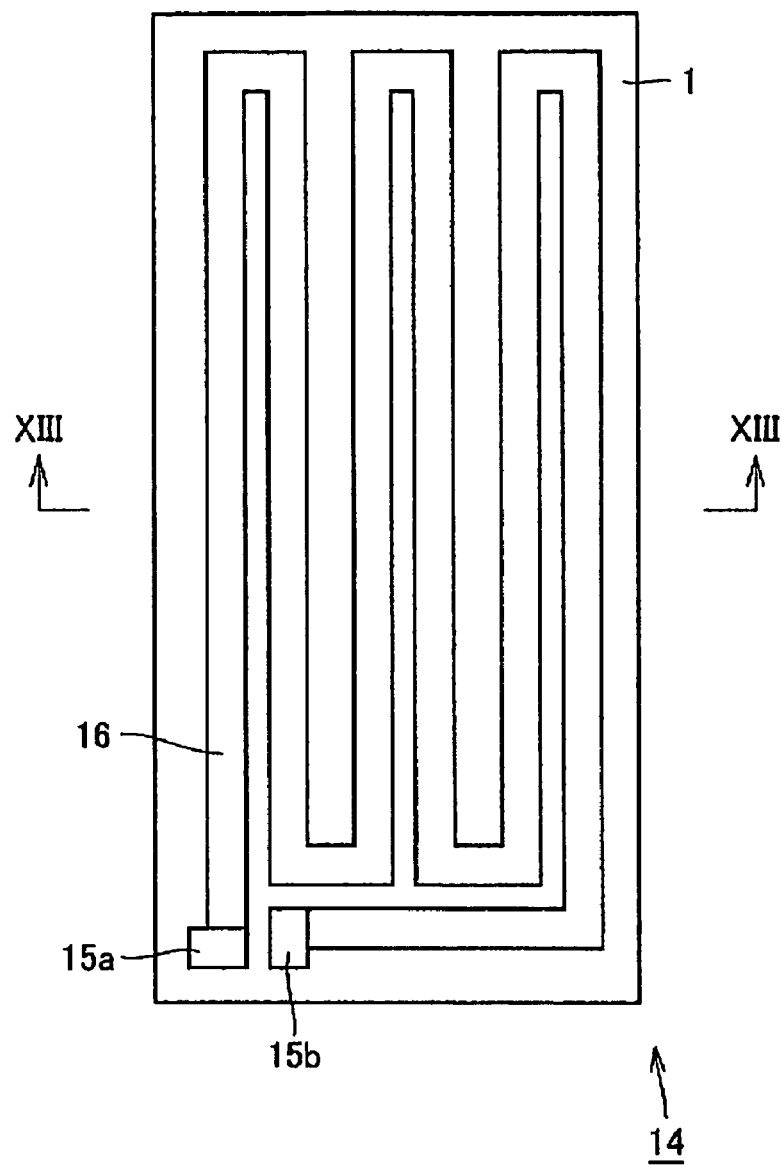
FIG. 12 is a schematic plane view illustrating a heater according to the present invention.
Figure 13:
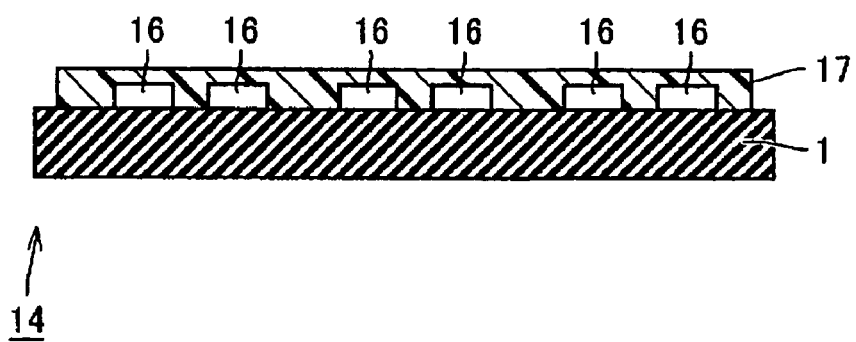
FIG. 13 is a schematic sectional view taken along the line XIII-XIII of FIG. 12.

FIG. 12 is a schematic plane view illustrating a heater according to the present invention. FIG. 13 is a schematic sectional view taken along the line XIII-XIII of FIG. 12. With reference to FIGS. 12 and 13, the heater 14 according to the present invention will be described.

As shown in FIGS. 12 and 13, the heater 14 of the present invention comprises a substrate 1 consisting of the aluminum nitride sintered body, a heating element 16 formed on the metallized layer on the top surface of the substrate 1, and an insulating layer 17 arranged to cover the heating element 16. In addition, on the top surface of the substrate 1, the electrode parts 15a and 15b are formed. The substrate 1 having the heating element 16 formed thereon may be a metallized substrate according to the second embodiment of the present invention. The heater 14 has a warpage ranging from 0 µm/mm to 5 µm/mm.

In this manner, by forming the heater 14 using the substrate 1 of the present invention, it is possible to manufacture the heater with large dimensions. Also, in order to form a plurality of small heaters, a large number of small heaters can be produced from a single piece of the substrate 1 by arranging a plurality of heating elements on the surface of the substrate 1. Further, since the substrate 1 is sufficiently large compared to the conventional one, the number of small heaters obtainable from the substrate 1 is increased, resulting in the reduction of production cost.

The heating element 16 can be formed by a method similar to the method used for forming the metallized layer 13 (FIG. 11) of the metallized substrate described in the second embodiment of the present invention. In addition, the heating element 16 may comprise high-melting point metals such as tungsten or molybdenum, or silver or silver alloys, etc.

In the case where the metallized layer mainly containing silver is used as the heating element 16, the metallized layer 13 may further comprise zinc (Zn) and copper (Cu). The content of Zn is preferably in the range of 0.1 wt. % to 3.0 wt. % in terms of ZnO. Also, the content of Cu is preferably in the range of 0.1 wt. % to 3.0 wt. % in terms of CuO. The metallized layer containing silver as its major component may further contain oxides of boron. In this case, the content of boron is preferably in the range of 0 wt. % to 2.0 wt. % in terms of $B_2O_3$. Further, the total content of boron, zinc and copper is preferably in the range of 0.2 wt. % to 5.0 wt. % in terms of oxides of each element.

Additionally, as the heating element 16, a layer comprising silver and palladium as major components can be used. The layer mainly comprising silver and palladium may further contain at least one selected from the group consisting of boron (B), lead (Pb), chromium (Cr) and calcium (Ca), and oxides thereof. The contents of boron, lead, chromium, and calcium in the metallized layer comprising silver and palladium as the major components are preferably in the ranges of 0.3 wt. % to 5.0 wt. % of boron in terms of $B_2O_3$, 0.3 wt. % to 5.0 wt. % of lead in terms of PbO, 0.1 wt. % to 3.0 wt. % of chromium in terms of $Cr_2O_3$, and 0.1 wt. % to 2.5 wt. % of calcium in terms of CaO, respectively.

Also, the metallized layer principally comprising silver and palladium may further comprise oxides of at least one element selected from the group consisting of aluminum (Al), nickel (Ni) and bismuth (Bi). The contents of these elements are preferably in the ranges of 0 wt. % to 1.0 wt. % of aluminum in terms of $Al_2O_3$, 0 wt. % to 0.5 wt. % of nickel in terms of NiO and 0 wt. % to 0.5 wt. % of bismuth in terms of $Bi_2O_3$, respectively. Additionally, the total content of aluminum, boron, lead, chromium, nickel, bismuth, and calcium is preferably in the range of 1.0 wt. % to 10 wt. % in terms of the oxides of each element.

Also, the insulating layer 17 may be formed to cover the entire portion of the heating element 16 as shown in FIG. 13, or to partially cover the heating element 16. As the insulating layer 17, a glass layer with electrically insulating properties may be used. This glass layer may contain each oxide of zinc, silicon, lead and manganese. Also, the contents of the elements contained in the glass layer are preferably in the range of 50 wt. % to 85 wt. % of zinc in terms of ZnO, 5.0 wt. % to 30 wt. % of silicon in terms of $SiO_2$, 3.0 wt. % to 15 wt. % of lead in terms of PbO, and 1.0 wt. % to 10 wt. % of manganese in terms of MnO.

All of the oxides of the respective elements such as zinc, silicon, lead and manganese show favorable wettability to the aluminum nitride sintered body containing each compound of calcium, ytterbium and neodymium. Therefore, when any of the above oxides is applied to the insulating layer 17 (FIG. 13), it is possible to realize excellent adhesiveness between the insulating layer 17 and the substrate 1 consisting of the aluminum nitride sintered body.

Further, the insulating layer 17 comprising the above oxides has the thermal expansion coefficient of 3.7 to $5.0 \times 10^{-6}$/IC, which is relatively close to the thermal expansion coefficient of the aluminum nitride sintered body. As a result, the generation of warpage in the substrate 1 can be reduced when the insulating layer 17 is formed.

Also, in the case where the insulating layer 17 has a composition of components within the range as described above, if a material comprising silver or a silver-read alloy as the major component is employed for the heating element 16, it is possible to perform firing of the insulating layer 17 at a temperature lower by about 100° C. than the firing temperature of the heating element 16 typically ranging from 800° C. to 900° C., that is, around 700° C. Since the firing of the insulating layer 17 can be performed at a relatively low temperature, it is possible to prevent a problem of foam generation on the heating element 16, which is caused by the mixing of glass components contained in the heating element 16 and glass components contained in the insulating layer 17 during the firing of the insulating layer 17.

Furthermore, in the heater 14 shown in FIGS. 12 and 13, although the heating element 16 is formed in a linear form on the surface of the substrate 1, it may also be formed in a plate-shaped form to cover the surface of the substrate 1. The heating element 16 can comprise, for example, a layer containing at least one selected from the group consisting of noble-metals such as silver, platinum, palladium and ruthenium etc. and alloys and compounds thereof, or a composite containing at least one metal selected from the above metal groups. Also, the material for forming the heating element 16 may comprise a composite containing at least one selected from the group consisting of carbides of silicon, simple substance of elements belonging to Groups 4A to 6A of the periodic table, and carbides, nitrides, borides and silicides of each of the above elements.

In addition, the thickness of the substrate 1 for constituting the heater 14 shown in FIGS. 12 and 13 preferably ranges from 0.4 mm to 2.0 mm. Also, the substrate 1 preferably comprises the aluminum nitride sintered body, and the average diameter of aluminum nitride particles contained in the substrate 1 is preferably 6.0 μm or less.

Also, though not shown in the drawings, control circuits and control devices for regulating the temperature of the heater 14 is preferably mounted on the same surface as that of the substrate 1 on which the heating element 16 is formed. Further, an element for detecting the temperature of the heater 14 and/or a circuit for controlling the device for detecting the temperature of the heater may be mounted on a substrate different from the substrate 1 having the heating element 16, and the different substrate may be mounted immediately above the heating element 16.

Further, although the heater 14 with a large area on which the heating element 16 and the insulating layer 17 is mounted directly may be formed over the surface of the substrate 1 having a maximum length equal to 320 mm or more as shown in FIGS. 12 and 13, a plurality of heaters may be produced from a single substrate 1 having a large area by dividing the substrate 1 into small parts.

The heater 14 of the present invention (FIG. 12) may be further applicable to a heating and fixing machine to fix toner images formed on a surface of a transcript material such as special paper used in general copying machines or printers. Further, the heater 14 can also be applied to a heating apparatus for various solid materials such as semiconductor devices or optical-devices, various gases including air or different gases, and various liquids such as water or other solutions.

EXAMPLES

Example 1

In order to confirm the effect of the present invention, samples were prepared as follows and were subjected to various measurements. First, the raw materials 1 to 3 containing the components listed in the following Table I were prepared.

TABLE I

| | | | | | | | (wt.%) |
|---|---|---|---|---|---|---|---|
| Name of raw material | Major raw material AlN | Aid $Y_2O_3$ | Aid $Nd_2O_3$ | Aid $Yb_2O_3$ | Aid $Al_2O_3$ | Aid $SiO_2$ | Aid CaO |
| Raw material -1 | 97.00 | 3.00 | 0.00 | 0.00 | 0.00 | 0.00 | 0.00 |
| Raw material -2 | 96.80 | 0.00 | 0.90 | 1.00 | 0.90 | 0.20 | 0.20 |
| Raw material -3 | 98.48 | 0.00 | 1.00 | 0.50 | 0.00 | 0.00 | 0.02 |

By using the above raw materials 1 to 3, a total of 63 samples from No. 1 to No. 63 shown in Tables II to IV were prepared by the production method described in the first embodiment of the present invention. The samples have different sizes of the substrates (length, width, thickness of the substrates), drying times in the drying step (S400) (FIG. 4), and volume ratios in a closed space during the sintering step (S600) (FIG. 4) (that is, a ratio of the volume of the molded body 22 to a volume of the space 8 shown in FIG. 9) as listed in Tables II to IV. Other production conditions of each sample are described as follows also.

In the raw material preparation step (S100) (FIG. 4), the raw materials 1 to 3 shown in Table I were prepared. Then, the mixing step (S200) (FIG. 4) was conducted to blend the components of each of the raw materials 1 to 3 with solvents. In the molding step (S300) (FIG. 4), the three mixtures from the raw materials 1 to 3 were formed into sheet-shaped molded bodies that are to be the samples No. 1 to No. 63. The doctor-blade method was adopted for preparing thin molded bodies having a thickness of less than 1 mm, while an extrusion method was used for preparing thicker molded bodies having a thickness not less than 1 mm.

Next, in the drying step (S400) (FIG. 4), the molded bodies that are to be the samples were subjected to natural drying for the drying times shown in Tables II to IV. Next, the jigs made of boron nitride (BN) shown in FIG. 5 were prepared for the respective samples such that the depressed portions of the jigs were formed to satisfy the closed space volume ratios shown in Tables II to IV. Each of the molded bodies was placed in each of the jigs. And the binder removing step (S500) (FIG. 4) was conducted under a condition of the heating temperature of 850° C. and nitrogen atmosphere. In addition, the heating temperature in the range of 400° C. to 900° C. can be used.

Next, in the sintering step (S600) (FIG. 4), each of the molded bodies after the binder removing step (S500) was subjected to sintering for 10 hours under the conditions of a heating temperature of 1,700° C., the atmospheric pressure controlled to normal pressure and nitrogen atmosphere. The sintering time may be in the range of 2 hours to 30 hours.

Next, the subsequent polishing step (S700) (FIG. 4) was conducted to polish a surface of the sintered bodies obtained. The thickness (chipping allowance) removed by the polishing step was 3 μm or less.

The warpage and waviness were measured for each of the samples obtained from the above processes. The method described in the first embodiment of the present invention was adopted as the method for determining the warpage and waviness. The sizes of samples and related conditions, and the measured results of the warpage and waviness are shown in Tables II to IV.

TABLE II

| Sample No. | Name of raw material | Length (mm) | Width (mm) | Maximum length (ML) (mm) | Thickness (mm) | Drying time (hr) | Closed space volume ratio (%) | Warpage (μm/mm) | Waviness (μm) | Crack |
|---|---|---|---|---|---|---|---|---|---|---|
| 1 | Raw material - 1 | 409 | 95 | 420 | 0.6 | 20 | 50 | 0.17 | 26 | No |
| 2* | | 409 | 95 | 420 | 0.6 | 0.5 | 50 | 2.26 | 110 | Yes |
| 3* | | 409 | 95 | 420 | 0.6 | 2 | 50 | 1.9 | 71 | No |
| 4* | | 409 | 95 | 420 | 0.6 | 5 | 50 | 1.19 | 62 | No |
| 5 | | 409 | 95 | 420 | 0.6 | 15 | 60 | 0.48 | 35 | No |
| 6 | | 409 | 95 | 420 | 0.6 | 25 | 50 | 0.19 | 20 | No |
| 7* | | 409 | 95 | 420 | 0.6 | 20 | 5 | 2.19 | 96 | Yes |
| 8* | | 409 | 95 | 420 | 0.6 | 20 | 15 | 1.9 | 74 | No |
| 9* | | 409 | 95 | 420 | 0.6 | 20 | 90 | 2.02 | 76 | Yes |
| 10* | | 409 | 95 | 420 | 1.8 | 0.5 | 5 | 2.05 | 95 | Yes |
| 11* | | 409 | 95 | 420 | 1.2 | 0.5 | 5 | 2.21 | 103 | Yes |
| 12* | | 409 | 95 | 420 | 0.6 | 0.5 | 5 | 2.98 | 115 | Yes |
| 13* | | 409 | 95 | 420 | 1.8 | 0.5 | 90 | 2.02 | 78 | Yes |
| 14* | | 409 | 95 | 420 | 1.2 | 0.5 | 90 | 2.33 | 83 | Yes |
| 15* | | 409 | 95 | 420 | 0.6 | 0.5 | 90 | 2.64 | 94 | Yes |
| 16 | | 368 | 95 | 380 | 0.6 | 20 | 50 | 0.16 | 27 | No |
| 17 | | 337 | 95 | 350 | 0.6 | 20 | 50 | 0.14 | 26 | No |
| 18 | | 311 | 95 | 325 | 0.6 | 20 | 50 | 0.12 | 21 | No |
| 19* | | 368 | 95 | 380 | 0.6 | 20 | 5 | 2.21 | 78 | Yes |
| 20* | | 337 | 95 | 350 | 0.6 | 20 | 5 | 2.29 | 86 | Yes |
| 21* | | 311 | 95 | 325 | 0.6 | 20 | 5 | 2.06 | 94 | Yes |

*Comparative examples

TABLE III

| Sample No. | Name of raw material | Length (mm) | Width (mm) | Maximum length (ML) (mm) | Thickness (mm) | Drying time (hr) | Closed space volume ratio (%) | Warpage (μm/mm) | Waviness (μm) | Crack |
|---|---|---|---|---|---|---|---|---|---|---|
| 22 | Raw material - 2 | 409 | 95 | 420 | 0.6 | 20 | 50 | 0.14 | 24 | No |
| 23* | | 409 | 95 | 420 | 0.6 | 0.5 | 50 | 2.24 | 115 | Yes |
| 24* | | 409 | 95 | 420 | 0.6 | 2 | 50 | 1.86 | 73 | No |
| 25* | | 409 | 95 | 420 | 0.6 | 5 | 50 | 1.07 | 58 | No |
| 26 | | 409 | 95 | 420 | 0.6 | 15 | 50 | 0.48 | 32 | No |
| 27 | | 409 | 95 | 420 | 0.6 | 25 | 50 | 0.21 | 21 | No |
| 28* | | 409 | 95 | 420 | 0.6 | 20 | 5 | 2.31 | 98 | Yes |
| 29* | | 409 | 95 | 420 | 0.6 | 20 | 15 | 1.86 | 62 | No |
| 30* | | 409 | 95 | 420 | 0.6 | 20 | 90 | 2.14 | 77 | Yes |
| 31* | | 409 | 95 | 420 | 1.8 | 0.5 | 5 | 2 | 100 | Yes |
| 32* | | 409 | 95 | 420 | 1.2 | 0.5 | 5 | 2.24 | 118 | Yes |
| 33* | | 409 | 95 | 420 | 0.6 | 0.5 | 5 | 3.24 | 130 | Yes |
| 34* | | 409 | 95 | 420 | 1.8 | 0.5 | 90 | 2.19 | 88 | Yes |
| 35* | | 409 | 95 | 420 | 1.2 | 0.5 | 90 | 2.52 | 93 | Yes |
| 36* | | 409 | 95 | 420 | 0.6 | 0.5 | 90 | 2.74 | 101 | Yes |
| 37 | | 368 | 95 | 380 | 0.6 | 20 | 50 | 0.13 | 25 | No |
| 38 | | 337 | 95 | 350 | 0.6 | 20 | 50 | 0.11 | 24 | No |
| 39 | | 311 | 95 | 325 | 0.6 | 20 | 50 | 0.12 | 19 | No |
| 40* | | 368 | 95 | 380 | 0.6 | 20 | 5 | 2.42 | 97 | Yes |

TABLE III-continued

| Sample No. | Name of raw material | Length (mm) | Width (mm) | Maximum length (ML) (mm) | Thickness (mm) | Drying time (hr) | Closed space volume ratio (%) | Warpage (μm/mm) | Waviness (μm) | Crack |
|---|---|---|---|---|---|---|---|---|---|---|
| 41* | | 337 | 95 | 350 | 0.6 | 20 | 5 | 2.4 | 83 | Yes |
| 42* | | 311 | 95 | 325 | 0.6 | 20 | 5 | 2.49 | 78 | Yes |

*Comparative examples

TABLE IV

| Sample No. | Name of raw material | Length (mm) | Width (mm) | Maximum length (ML) (mm) | Thickness (mm) | Drying time (hr) | Closed space volume ratio (%) | Warpage (μm/mm) | Waviness (μm) | Crack |
|---|---|---|---|---|---|---|---|---|---|---|
| 43 | Raw material - 3 | 409 | 95 | 420 | 0.6 | 20 | 50 | 0.17 | 20 | No |
| 44* | | 409 | 95 | 420 | 0.6 | 0.5 | 50 | 2.33 | 123 | Yes |
| 45* | | 409 | 95 | 420 | 0.6 | 2 | 50 | 1.98 | 72 | No |
| 46* | | 409 | 95 | 420 | 0.6 | 5 | 50 | 1.29 | 63 | No |
| 47 | | 409 | 95 | 420 | 0.6 | 15 | 50 | 0.67 | 27 | No |
| 48 | | 409 | 95 | 420 | 0.6 | 25 | 50 | 0.17 | 26 | No |
| 49* | | 409 | 95 | 420 | 0.6 | 20 | 5 | 2.38 | 79 | Yes |
| 50* | | 409 | 95 | 420 | 0.6 | 20 | 15 | 1.95 | 60 | No |
| 51* | | 409 | 95 | 420 | 0.6 | 20 | 90 | 2.19 | 76 | Yes |
| 52* | | 409 | 95 | 420 | 1.8 | 0.5 | 5 | 2.26 | 115 | Yes |
| 53* | | 409 | 95 | 420 | 1.2 | 0.5 | 5 | 2.69 | 122 | Yes |
| 54* | | 409 | 95 | 420 | 0.6 | 0.5 | 5 | 3.33 | 132 | Yes |
| 55* | | 409 | 95 | 420 | 1.8 | 0.5 | 90 | 2.21 | 100 | Yes |
| 56* | | 409 | 95 | 420 | 1.2 | 0.5 | 90 | 2.71 | 95 | Yes |
| 57* | | 409 | 95 | 420 | 0.6 | 0.5 | 90 | 2.9 | 86 | Yes |
| 58 | | 368 | 95 | 380 | 0.6 | 20 | 50 | 0.21 | 18 | No |
| 59 | | 337 | 95 | 350 | 0.6 | 20 | 50 | 0.2 | 17 | No |
| 60 | | 311 | 95 | 325 | 0.6 | 20 | 50 | 0.18 | 15 | No |
| 61* | | 368 | 95 | 380 | 0.6 | 20 | 5 | 2.42 | 94 | Yes |
| 62* | | 337 | 95 | 350 | 0.6 | 20 | 5 | 2.23 | 85 | Yes |
| 63* | | 311 | 95 | 325 | 0.6 | 20 | 5 | 2.09 | 78 | Yes |

*Comparative examples

Herein, the samples with * shown in Tables II to IV are the samples of comparative examples. On the contrary, the samples without * are the samples of examples according to the present invention. As seen from Tables II to IV, it is clear that the samples of the present invention have sufficiently small warpage and waviness.

Example 2

With respect to the samples No. 1 to No. 63 shown in Tables II to IV, the electrode part and the heating element were prepared on the surface of each sample as shown in FIGS. 12 and 13 by using the screen-printing method. More specifically, by using the screen-printing method as shown FIG. 14, a silver-platinum (Ag—Pt) paste was applied to the portions where electrode parts 15a and 15b (FIG. 12) were to be formed, and a silver-palladium (Ag—Pd) paste was applied to the portion in which the heating element 16 was to be formed.

Figure 14:
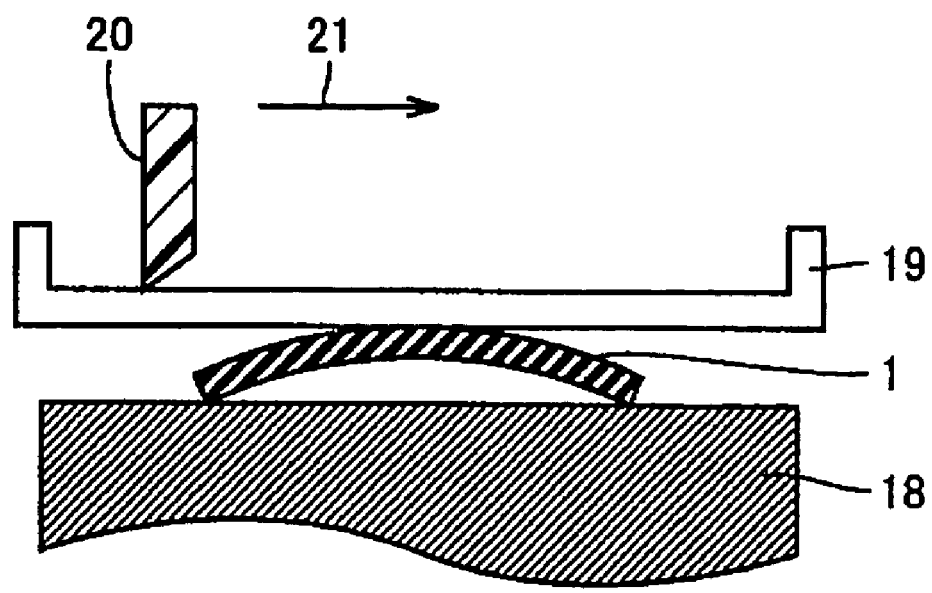
FIG. 14 is a schematic sectional view explaining a screen printing method used to form the heating element and the electrode part on the surface of each sample (substrate).

FIG. 14 is a schematic sectional view to explain the screen-printing method used to form the heating element and the electrode part on the surface of each sample, that is, the substrate. As shown in FIG. 14, each sample (substrate 1) is placed on top of the upper surface of a base 18, then a screen 19 is placed on the substrate 1. On the screen 19, patterns for the heating element, the electrode part, etc. are formed beforehand. The paste to constitute the electrode parts 15a and 15b (FIG. 12) or the heating element 16 (FIG. 12) is placed on the screen 19, and a squeegee 20 is moved in the direction indicated by an arrow 21 while pressing the squeegee 20 toward the substrate 1. As a result, the Ag—Pt paste or the Ag—Pd paste can be supplied on the surface of the substrate 1 with a predetermined pattern through the screen 19. And, by conducting a desired heat-treatment, the electrode parts 15a and 15b and the heating element 16 (FIG. 12) can be formed on the surface of the substrate 1.

When the screen-printing method is conducted as described above, cracks may be generated in the sample if warpage or waviness is present on the sample (substrate 1). Therefore, the generation of cracks on the sample due to the screen-printing method was examined for all of the samples. The results are shown in the "crack" column in Tables II to IV As seen in Tables II to IV, cracks were found in the samples (the sintered bodies) having the warpage of 2 μm/mm or more or the waviness of 76 μm or more. And, there was no generation of cracks in the samples of the examples of the present invention even after carrying out the screen-printing method since all of these samples had sufficiently small warpage and waviness.

Example 3

With respect to the samples Nos. 1, 22 and 43 among the samples listed in Tables II to IV, the thermal conductivity was measured for each sample before performing screen-printing of the pastes to be formed into the electrode parts 15a and 15b (FIG. 12) and the heating element 16 (FIG. 12) on the surface of the sample. The measurement was performed by the laser-flashing method. Then, the Ag—Pt paste and Ag—Pd paste were introduced on the surfaces of the above-mentioned samples Nos. 1, 22 and 43 according to a given pattern by using the screen-printing method as described in Example 2.

Subsequently, the samples provided with the pastes were subjected to firing at a temperature ranging from 750° C. to 900° C. in the air for 2 hours. The firing temperature is preferably 850° C. Thus, the electrode parts 15a and 15b (FIG. 12) and the heating element 16 (FIG. 12) were formed on the surface of each sample.

Further, a glass material was screen-printed to form the electrical insulating layer 17 (FIG. 13) serving as a protective layer on the surface on which the electrode parts 15a, 15b and the heating element 16 were formed. And, each sample that was screen-printed with such glass material was subjected to firing at the temperature ranging from 600° C. to 750° C. under the atmospheric environment for 3 hours. The firing temperature in this case is preferably 700° C. As a result, the sample having a structure shown in FIG. 13 was produced.

Thereafter, lead wires were connected by soldering to the electrode parts 15a and 15b of the samples (FIG. 12) produced as the heater as described above. And, by supplying a predetermined electrical current to the heating element 16 through the lead wires and the electrode parts 15a, 15b, the heating element 16 was heated. The amount of electrical current was set up to allow the central portion of the sample serving as the heater to reach a temperature of 150° C. Under such condition, it was observed whether softening, etc. of the solder occurred at the respective soldered-portions between the electrode parts 15a and 15b and the lead wires. The results are shown in Table V.

TABLE V

| Name of raw material | Sample No. | Thermal conductivity (W/m · K) | Softening/melting of solder |
| --- | --- | --- | --- |
| Raw material - 1 | 1 | 180 | Partial melting |
| Raw material - 2 | 22 | 95 | None |
| Raw material - 3 | 43 | 130 | Softening |

As seen also in Table V, since the values of thermal conductivity of the samples Nos. 1 and 43 using the raw material-1 and the raw material-3, respectively, were relatively high, a softened portion and a partially molten portion were observed in these samples at the connection between the electrode parts and the lead wires. On the contrary, since the thermal conductivity of the sample No. 22 using the raw material-2 was relatively low, softening or melting did not occur at the connection between the electrode parts and the lead wires.

The above preferred embodiments and examples disclosed in this document are only illustrative and not intended to limit the scope of the invention. The scope of the present invention is not defined by the embodiments or examples described above, but it is defined by the claims, and it is intended to include all the modifications within the meaning and range that are equivalent to the scope of the claims.

INDUSTRIAL APPLICABILITY

As described above, an aluminum nitride sintered body having a large area and a small thickness compared to conventional ones, and also having small warpage and waviness height is simply and easily obtainable by the present invention. Accordingly, when employing the aluminum nitride sintered body of the present invention as a base in electronic parts, etc., it is possible to easily manufacture electronic parts (for example, heater, etc.) with a size larger than the conventional art.

The invention claimed is:

1. An aluminum nitride sintered body having a maximum length of 320 mm or more, a thickness of more than 0 mm and 2 mm or less, a warpage of 0 μm/mm or more and less than 1 μm/mm, and a local waviness height of 0 μm or more and 50 μm or less after a sintering step is finished.

2. An aluminum nitride sintered body having a maximum length of 320 mm or more, a thickness of more than 0 mm and 2 mm or less, a warpage of 0 μm/mm or more and less than 1 μm/mm, and a local waviness height of 0 μm or more and 50 μm or less, wherein the sintered body is formed by polishing one side of the sintered body according to claim 1 with a polishing allowance of 10 μm or less.

3. The aluminum nitride sintered body according to claim 1 wherein the sintered body has a thickness of less than 1, mm.

4. The aluminum nitride sintered body according to claim 1, wherein the sintered body has a thermal conductivity of 85 W/m·K or more and 105 W/m·K or less and is used for a heater substrate.

5. A metallized substrate comprising:
a plate-shaped substrate made of an aluminum nitride sintered body having a maximum length of 320 mm or more, a thickness of more than 0 mm and 2 mm or less, a warpage of 0 μm/mm or more and less than 1 μm/mm, and a local waviness height of 0 μm or more and 50 μm after a sintering step is finished; and
an electrically conductive metallized layer that is formed on at least a part of the substrate.

6. The metallized substrate according to claim 5, comprising:
a substrate including an aluminum nitride sintered body having a maximum length of 320 mm or more, a thickness of more than 0 mm and 2 mm or less, and a local waviness height of 0 μm or more and 50 μm or less;
an electrically conductive metallized layer formed on at least a part of a surface of the substrate, wherein the metallized substrate has a warpage of 0 μm/mm or more and 5 μm/mm or less.

7. A heater comprising:
a metallized substrate comprising a plate-shaped substrate made of an aluminum nitride sintered body having a maximum length of 320 mm or more, a thickness of more than 0 mm and 2 mm or less, a warpage of 0 μm/mm or more and less than 1 μm/mm, and a local waviness height of 0 μm or more and 50 μm or less after a sintering step is finished, an electrically conductive metallized layer formed on at least a part of the substrate;
an electrode part arranged on the metallized layer and connected to the metallized layer; and
an insulating layer arranged on the metallized layer.

* * * * *